United States Patent [19]

Dick

[11] Patent Number: 5,465,820
[45] Date of Patent: Nov. 14, 1995

[54] CLUTCH ACTUATING DEVICE FOR USE IN A VEHICLE DRIVETRAIN SUBASSEMBLY

[75] Inventor: Wesley M. Dick, Ft. Wayne, Ind.

[73] Assignee: Dana Corporation, Toledo, Ohio

[21] Appl. No.: 273,868

[22] Filed: Jul. 12, 1994

[51] Int. Cl.$^6$ .................................................. B60K 23/08
[52] U.S. Cl. ........................ 192/35; 192/93 A; 192/48.4
[58] Field of Search .......................... 192/35, 48.1, 48.2, 192/48.3, 48.4, 93 A; 74/665 GE; 180/247, 248

[56] References Cited

U.S. PATENT DOCUMENTS

| | | | |
|---|---|---|---|
| 872,062 | 11/1907 | Hilliard | 192/70.11 |
| 880,664 | 3/1908 | Hilliard | 192/70.2 |
| 2,008,967 | 7/1935 | Rossmann | 192/35 |
| 2,061,787 | 11/1936 | Warner | 192/40 |
| 2,072,832 | 3/1937 | Weydell | 192/3.56 |
| 2,623,619 | 12/1952 | Clerk | 192/35 |
| 3,724,619 | 4/1973 | Miller | 192/18 |
| 4,645,049 | 2/1987 | Matsuda et al. | 192/35 |
| 4,677,877 | 7/1987 | Anderson et al. | 475/154 |
| 4,738,163 | 4/1988 | Anderson et al. | 475/321 |
| 4,753,330 | 6/1988 | Ohzono et al. | 192/48.4 |
| 4,966,267 | 10/1990 | Carlton | 192/48.91 |
| 4,976,347 | 12/1990 | Sakakibara et al. | 192/20 |
| 5,083,986 | 1/1992 | Teraoka et al. | 475/86 |
| 5,199,325 | 4/1993 | Reuter et al. | 74/861 |
| 5,271,478 | 12/1993 | Kameda et al. | 180/247 |
| 5,373,912 | 12/1994 | Haiki et al. | 180/248 X |
| 5,398,792 | 3/1995 | Teraoka | 192/35 X |

OTHER PUBLICATIONS

U.S. Patent Application by Dick et al., in its entirety, having S/N 08/273,722, filed Jul. 12, 1994 entitled "Clutch Actuating Device For Use In A Vehicle Drivetrain Subassembly".

U.S. Patnet Application by Dick, in its entirety, having S/N 08/273,644, filed Jul. 12, 1994 entitled "Clutch Actuating Device For Use In A Vehicle Drivetrain Subassembly".

*Primary Examiner*—Richard M. Lorence
*Attorney, Agent, or Firm*—Oldham & Oldham Co.

[57] ABSTRACT

The invention is directed to a clutch actuating device for use in a vehicle drivetrain subassembly having a clutch. The clutch actuating device comprises first and second rotating members which are rotatably mounted to a drive member of a vehicle drivetrain subassembly. The first and second rotating members are rotatable relative to the drive member, and are also rotatable relative to each other. First and second clutch loading members are also rotatably mounted to the drive member, and relative to one another, with the first and second clutch loading members engaging one another to cause axial translation relative to one another upon relative rotation therebetween. First and second pilot clutches, including at least one rotatable plate, are coupled to one of the first or second rotating members. The pilot clutches are selectively grounded to cause relative rotation between the first and second rotating members, which in turn causes differential rotation of the clutch loading members. Differential rotation between the clutch loading members causes axial translation of the first clutch loading means relative to the other so as to engage the drivetrain subassembly clutch. Alternatively, the other of the pilot clutches may be activated to cause axial translation in an opposite direction so as to disengage the drivetrain subassembly clutch.

13 Claims, 4 Drawing Sheets

CLUTCH ACTUATING DEVICE FOR USE IN A VEHICLE DRIVETRAIN SUBASSEMBLY

CROSS-REFERENCE TO RELATED APPLICATIONS

The subject matter of the present invention is related to commonly assigned and concurrently filed U.S. patent applications having Ser. Nos. 08/273,722 and 08/273,644 (Attorney Docket Nos. 5894-V and 5894-VV).

BACKGROUND OF THE INVENTION

The present invention relates generally to a clutch actuating device and, more particularly, to a clutch actuating device for use in a vehicle drivetrain subassembly.

Four-wheel drive systems for vehicles are being utilized to a greater extent, providing increased traction and safety of operation for the vehicle, particularly during inclement weather conditions or off highway conditions as compared to that provided by conventional two-wheel drive systems. Fourwheel drive systems typically include a torque transfer case which includes an input shaft connected to and driven by the output shaft of the main transmission. The transfer case includes a rear output shaft connected to drive the rear wheels of the vehicle, a front output shaft connected to drive the front wheels of the vehicle, and means for drivingly connecting the input shaft to the front and rear output shafts.

In a known four-wheel drive system, characterized as a "part-time" system, a direct drive connection is provided between the front and rear output shafts of the transfer case when the vehicle is operated in a four-wheel drive mode. Such a direct drive connection does not permit the transfer case to accommodate different front and rear wheel speeds which can occur when turning the vehicle. Accordingly, the four-wheel drive mode is generally used only on a "part-time" basis, for example when lower friction road surface conditions, such as wet or snow covered pavement, may require increased traction capabilities. Consequently, the system may selectively operate in either a two-wheel drive mode or a four-wheel drive mode. Alternatively, the transfer case may operate in an "on-demand" four-wheel drive mode. In an "on-demand" four-wheel drive system, four-wheel drive operation is activated when desired based upon road conditions, vehicle operational characteristics or other factors. A control system is used to actuate the four-wheel drive clutch for four-wheel drive operation.

A four-wheel drive clutch provides the direct drive connection between the front and rear output shafts of the transfer case. The four-wheel drive clutch has been actuated using a rotary electric motor and an associated gear reduction from attached.

SUMMARY OF THE INVENTION

The present invention is therefore directed to a clutch actuating device for use in a vehicle drivetrain subassembly having a clutch. The clutch actuating device comprises first and second rotating members which are rotatably mounted to a drive member of a vehicle drivetrain subassembly. The first and second rotating members are rotatable relative to the drive member, and are also rotatable relative to each other. First and second clutch loading means are also rotatably mounted to the drive member, and relative to one another, with the first and second clutch loading means engaging one another to cause axial translation of the clutch loading means relative to one another upon relative rotation therebetween. First and second pilot clutches, including at least one rotatable plate, are provided, being coupled to one of the first or second rotating members. The pilot clutches enable selective grounding of one of the rotating members to cause differential rotation between the rotating members. Means for selectively grounding the first and second pilot clutches are provided, wherein activation of one of the pilot clutches causes relative rotation between the first and second rotating members, which in turn causes differential rotation of the clutch loading means. Differential rotation between the clutch loading means causes axial translation of the first clutch loading means relative to the other so as to engage the drivetrain subassembly clutch. Alternatively, the other of the pilot clutches may be activated to cause axial translation in an opposite direction so as to disengage the drivetrain subassembly clutch.

A main advantage of the clutch actuating device of the present invention is that the force required to actuate the vehicle drivetrain subassembly is significantly smaller than previous systems, since most of the clutch actuation energy is provided by a rotating drive member of the drivetrain subassembly. The clutch actuating device provides a simplified and cost-effective clutch actuation device.

BRIEF DESCRIPTION OF THE DRAWINGS

The aforementioned advantage, as well as other advantages of the present invention, will become apparent from the subsequent detailed description of the preferred embodiments, when taken in conjunction with the accompanying drawings, wherein.

DETAILED DESCRIPTION OF THE INVENTION

Figure 1:
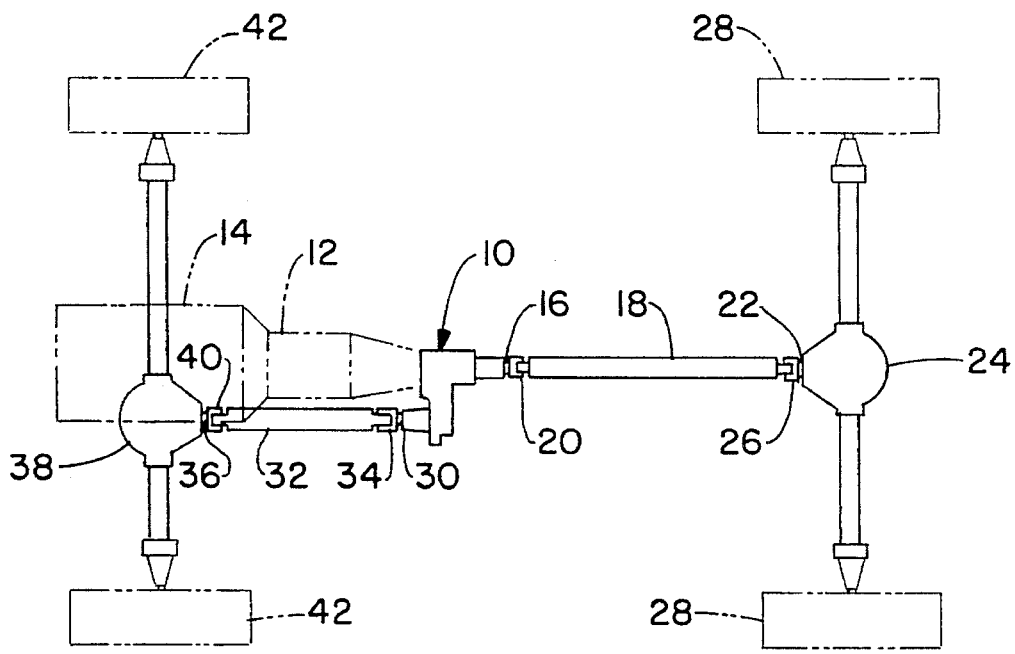
FIG. 1 is a top-plan view illustrating a four-wheel drive system which may incorporate the clutch actuating device of the invention.

Referring now to the drawings, FIG. 1 schematically illustrates a four-wheel drive system which includes a torque transfer case 10 incorporating the clutch actuating device (not shown in FIG. 1) of the present invention. The torque transfer case 10 is provided to shift from the two-wheel and four-wheel drive modes of a vehicle and is coupled with a conventional transmission unit 12 which in turn is coupled to a vehicle drive engine 14. Transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the rear drive shaft 18 between the rear wheels 28 of the vehicle.

Transfer case 10 is also provided with a front output shaft or yoke 30 which is drivingly connected to the rearward end of a vehicle front drive shaft 32 by means of a universal joint coupling 34. The front drive shaft 32 has a forward end connected to an input shaft or yoke 36 of a vehicle front differential unit 38 by means of a universal joint coupling 40 and is adapted to divide torque received from drive shaft 32 between the vehicle front wheels 42.

Figure 2:
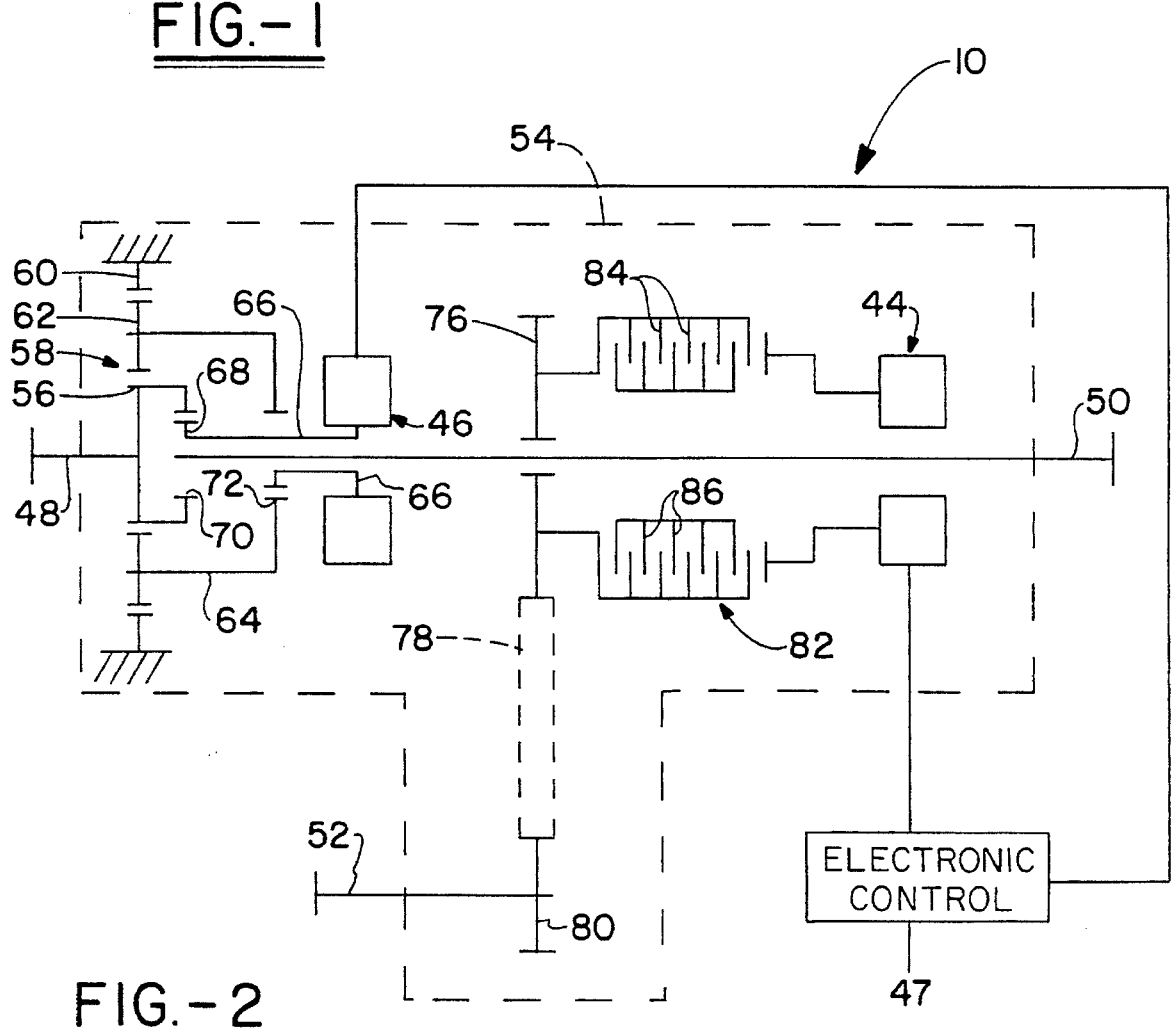
FIG. 2 is a schematic diagram illustrating one example of a torque transfer case incorporating the clutch actuating device of the invention.

Referring now to FIG. 2, there is shown a schematic diagram of an exemplary transfer case 10 of FIG. 1, which incorporates a clutch actuation device, generally indicated at 44. Transfer case 10 may include an electric range shift actuator, generally indicated at 46 used in conjunction with a microprocessor-based electronic control 47 to shift the transfer case 10 between high range, neutral and low range operating modes, as discussed in greater detail in U.S. Pat. No. 5,199,325 issued Apr. 6, 1993, which is herein expressly incorporated by reference. As shown in FIG. 2, the transfer case 10 includes an input shaft 48 coupled to the output shaft of the vehicle transmission 12 (shown in FIG. 1), a rear output shaft 50 for connection to the vehicle rear drive shaft 18, and a front output shaft 52 for connection to the vehicle front drive shaft 32.

The input shaft 48 is rotatably supported at the forward end of a transfer case housing 54 and a planetary gear reduction assembly, generally indicated at 58, is used to achieve the low gear operating range. The planetary gear assembly 58 selectively introduces a predetermined gear reduction to define the low speed range.

The transfer case 10 further comprises a first drive sprocket 76 which is rotatably supported on a central portion of the rear output shaft 50 and is connected by a drive chain 78 to drive a second drive sprocket 80 which is rotatably supported within transfer case housing 54 and connected to drive the front output shaft 52. A multi-disc four-wheel drive clutch, generally indicated at 82, is provided to control torque input to the front output shaft 52, and includes a first group of clutch plates 84 which, while axially movable, are secured for rotation with the first drive sprocket 76. A second group of clutch plates 86 are secured for rotation with the rear output shaft 50, and are also axially movable. Four-wheel drive clutch 82 is actuated by clutch actuating device 44, as subsequently discussed in greater detail. When clutch 82 is disengaged, the vehicle is operated in a two-wheel drive mode, with all the driving torque directed to the rear wheels of the vehicle via output shaft 50. When clutch 82 is fully engaged, a direct drive connection is provided between rear output shaft 50 and front output shaft 52 so that torque is distributed to the front and rear wheels of the vehicle based upon the traction available at each wheel. The various modes of operation of the transfer case 10, which may include an automatic "on-demand" four-wheel drive mode using electronic control 47, are discussed in greater detail in U.S. Pat. No. 5,199,325.

Figure 3:
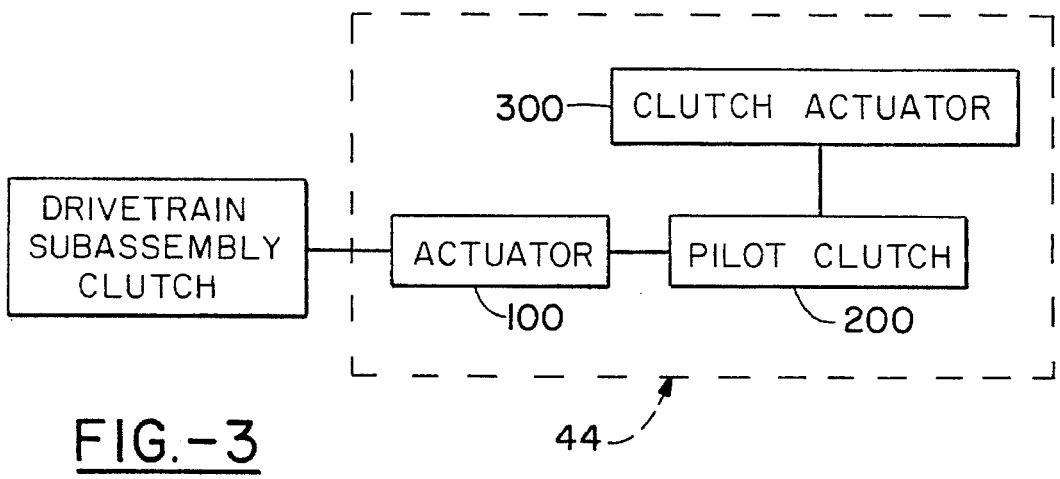
FIG. 3 is a schematic diagram illustrating the sub-systems which may be included as part of the clutch actuating device of the invention.

The clutch actuating device of the present invention, which is indicated generally at 44 in FIG. 2, comprises a number of subsystems which are illustrated schematically in FIG. 3 and include the following: an actuator mechanism 100 comprising a pair of rotating members which are free to rotate relative to a drive member of the drivetrain subassembly and relative to one another. The mechanism 100 further includes a pair of clutch loading members, used to engage or disengage the vehicle drivetrain subassembly clutch. A pilot clutch means 200, comprising a pair of pilot clutches, is used to cause differential rotation between the clutch loading members so as to produce corresponding axial translation therebetween to load or unload the drivetrain subassembly clutch. A pilot clutch activation means 300 is used to selectively activate individual pilot clutches of pilot clutch means 200. The rotating members of actuator mechanism 100 are preferably spline collars differentially driven by means of the pilot clutch means 200, and the clutch loading members preferably include load cam members having cooperating ramp surfaces as will be hereinafter described. The pilot clutches of clutch means 200 may be constructed of a variety of configurations including at least one rotatable plate; and the pilot clutch activating means 300 may comprise a hydraulic system or a pair of electromagnets and associated coils, a single electromagnet with concentric coils or other known mechanical or pneumatic systems. The numerical designations of the various subsystems depicted schematically in FIG. 3 will remain the same throughout each of the subsequently discussed embodiments of the clutch actuating device 44.

Figure 4:
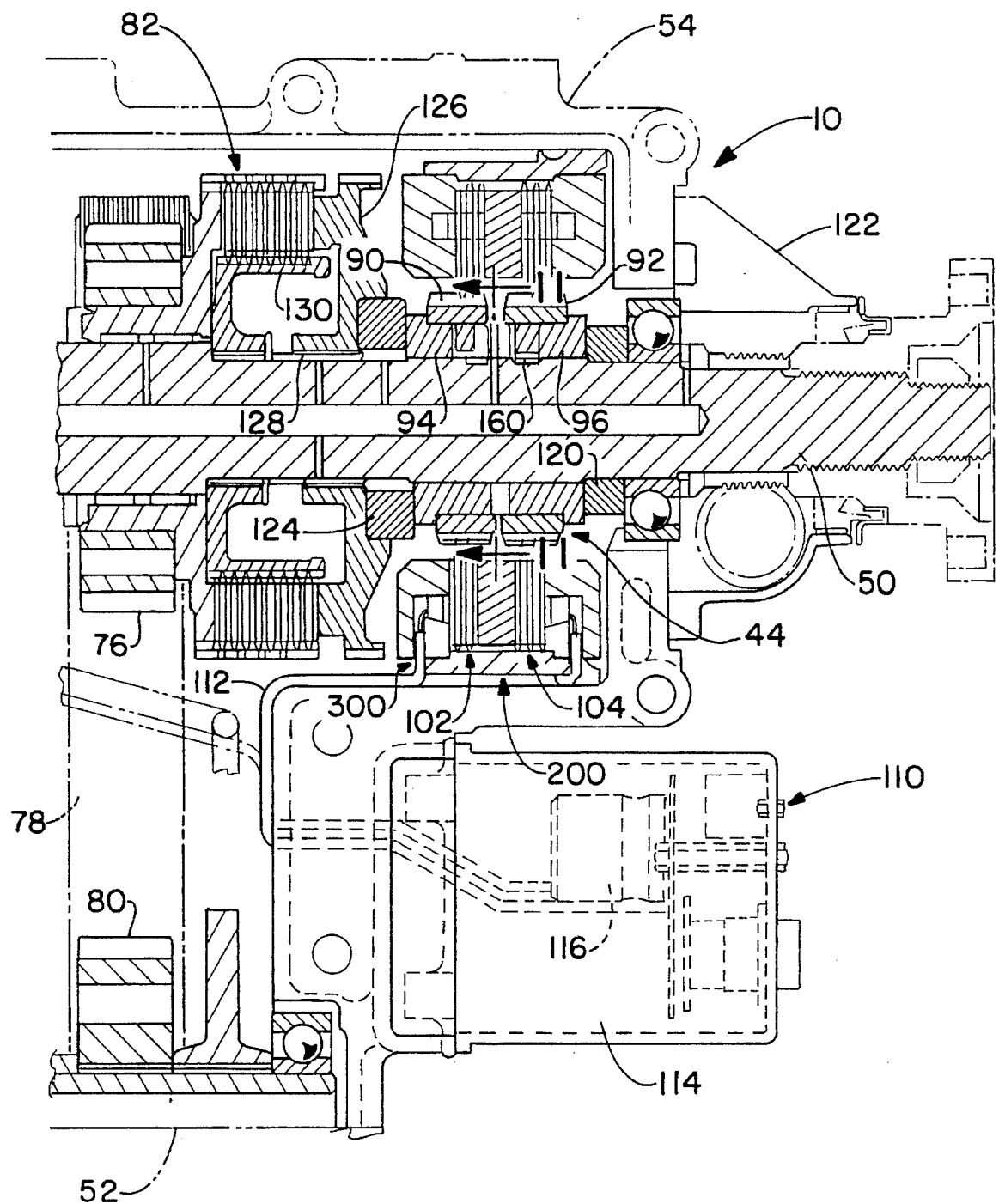
FIG. 4 is a partial cross-sectional view illustrating a potion of a torque transfer case which incorporates the clutch actuating device of the invention.

Referring now to FIG. 4, a torque transfer case 10, comprising an illustrative vehicle drivetrain subassembly, will be discussed with particular attention to the structural features and functions of the clutch actuating device 44 according to a first embodiment of the present invention. It is noted that only a portion of transfer case 10 is shown which includes the clutch actuating device of the invention. The actuator mechanism 100 of clutch actuating device 44 comprises first and second rotating members 90 and 92, respectively, which are rotatably mounted around output shaft 50. Accordingly, members 90 and 92 are free to rotate relative to one another and relative to output shaft 50.

The actuator mechanism 100 further includes first and second clutch loading means 94 and 96 which are rotatably mounted to the rear output shaft 50 and are also rotatable relative to one another. As will be hereinafter described in more detail, the first and second clutch loading means 94 and 96 engage one another to cause axial translation relative to one another upon relative rotation therebetween. The clutch actuating members 94 and 96 are slip-fit on shaft 50, and rotation of shaft 50 will cause rotation of members 94 and 96 with shaft 50 even though members 94 and 96 are rotatable relative to shaft 50. The clutch actuating device 44 further includes pilot clutch means 200, comprising first and second pilot clutches, each of which comprise a plurality of annular rotatable plates 106 and 108 which are interleaved with one another. The plates 106 are connected to the first and second rotating members 90 and 92 via splined connections therewith. Plates 108 are grounded in association with the transfer case housing 54. The first and second pilot clutches comprise at least one rotatable plate coupled to the first and second rotating members 90 and 92, wherein actuation of the pilot clutches 102 and 104 will selectively ground one of the rotating members 90 or 92 for loading or unloading of the main clutch 82 used to activate or deactivate a four-wheel drive mode for the vehicle. Means for selectively activating pilot clutches 102 and 104 are indicated generally at 300 and may comprise a hydraulic system generally indicated at 110, which includes supply lines 112 to the pilot clutches 102 and 104 coupled to a reservoir 114 containing hydraulic fluid. Hydraulic pressure is generated by a hydraulic pump 116, which may be controlled by any suitable means. The hydraulic system 110 selectively supplies hydraulic fluid to one of the pilot clutches 102 or 104 to ground the interleaved plates 106 in association with plates 108 fixed with housing Alternatively, any other suitable means for actuating the pilot clutches 102 and 104 are contemplated herein, such as the electromagnetic pilot clutch activating means described in the specified related pending applications, or other suitable mechanical or pneumatic systems as desired. The pilot clutch activating means 300 allows selective actuation of pilot clutches 102 and 104 to selectively ground one or the other of the first and second rotating members 90 and 92 to load or unload main clutch 82 of the torque transfer case 10.

Also associated with the clutch activating device 44 may be a means for locking one of the first or second clutch loading means 94 or 96 to shaft 50 to prevent relative rotation therebetween. The means for locking the first or second clutch loading means 94 or 96 facilitates loading or unloading of the main clutch 82, providing relative rotation between the first and second clutch loading means 94 and 96 upon actuation of one of the pilot clutches 102 or 104 and grounding of one of the rotatable members 90 or 92. The clutch actuating device 44 is positioned within the transfer case housing 54 by means of a non-rotatable shoulder 120 which is pressed into a shoulder provided on shaft 50 relative to bearing means 122 rotatably supporting rear output shaft 50. Similarly, a mating member 124 is pressed into the pressure plate 126 of main clutch 82 which is mounted to output shaft 50 via a splined a connection 128 which permits limited axial movement of pressure plate 126 toward and away from the clutch pack 130 of main clutch 82. The mating member 124 is acted upon by the clutch loading means 94 to cause axial movement of pressure plate 126 which exerts an axial force to engage clutch 82. Actuation of main clutch 82 serves to connect rear output shaft 50 and first drive sprocket 76 which is rotatably supported on shaft 50. As previously described, the first drive sprocket 76 transmits driving power to a second drive sprocket 80 splined to the front output shaft, by means of a chain 78. Thus, upon actuation of clutch 82, drive torque supplied from the vehicle transmission will be transmitted to both the rear output shaft 50 as well as front output shaft 52 for four-wheel drive operation.

Figures 5, 6:
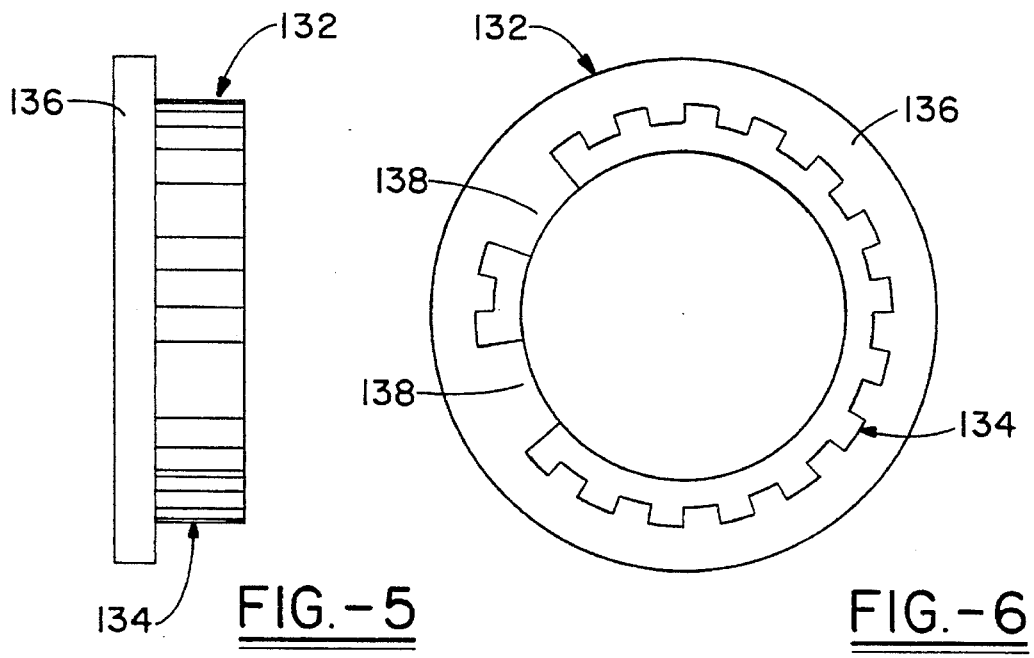
FIG. 5 is a side elevational view of a spline collar forming part of the clutch actuating device of the invention.
FIG. 6 is a side view of the spline collar shown in FIG. 5.

The operation of the clutch actuating device 44 will be further understood in looking at preferred embodiments of the various components thereof. In FIGS. 5 and 6, the first and second rotating members 90 and 92 are preferably formed as splined collars, which comprise an annular member 132 mounted on the rear output shaft 50 as shown in FIG. 4. The spline collar 132 may comprise a spline section 134 and an outwardly extending flange portion 136. The spline portion 134 may include several slots 138, the purpose of which will be hereinafter described. As previously mentioned, the first and second rotating members 90 and 92 are engaged by pilot clutches 102 and 104, wherein actuation of a pilot clutch will drive the spline collar 132 to which it is coupled to result in relative rotation between the first and second rotatable matters 90 and 92. In the preferred embodiment, the spline collar 132 forming the rotatable members 90 and 92 provides a spline connection to the at least one plate of a pilot clutch 102 or 104 for differentially driving the first and second spline collars 132 relative to one another.

Figures 7, 8:
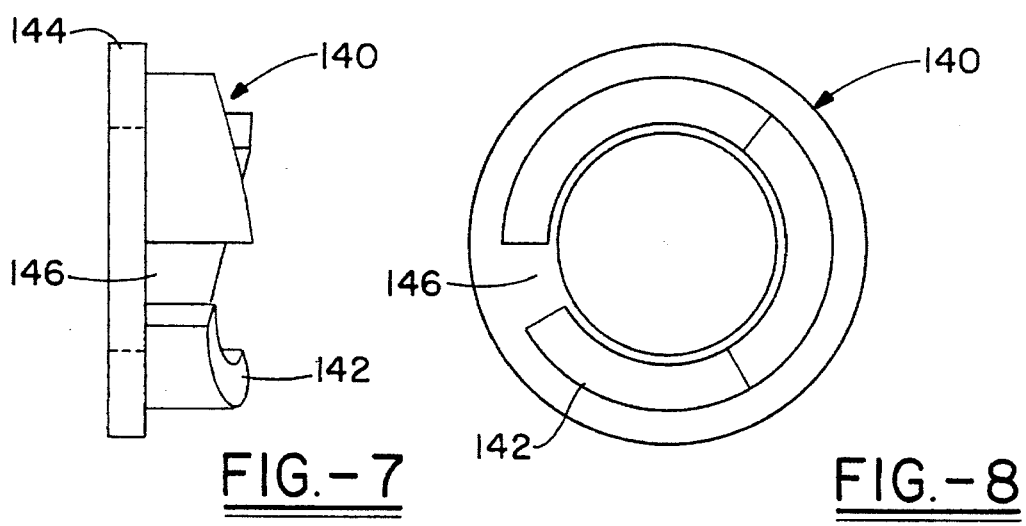
FIG. 7 is a side elevation view of a load cam member forming a part of the clutch actuating device.
FIG. 8 is a side view of the load cam member shown in FIG. 4.
Figure 9:
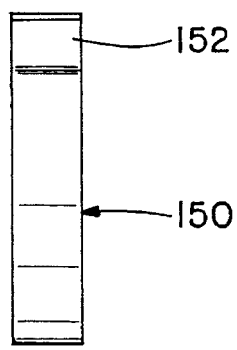
FIG. 9 is a side elevational view of a locking spring forming a part of the clutch actuating device of the invention.
Figure 10:
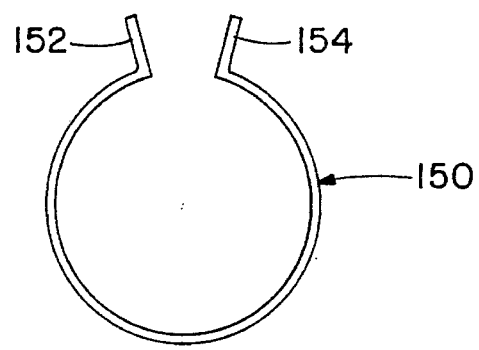
FIG. 10 is a side view of the locking spring as shown in FIG. 9.

Also in the preferred embodiment, the first and second clutch loading means 94 and 96 as shown in FIG. 4 may comprise a pair of annular load cam members 140 as shown in FIGS. 7 and 8. The load cam members 140 include a plurality of ramp surfaces 142 and a flange portion 144. The load cam member 140 further includes a slot 146 formed in the ramp portion thereof. Two of the load cam members 140 are positioned relative to one another in the clutch actuating device 44 such that the ramp surfaces 142 engage one another. In such an arrangement, it should be recognized that upon relative rotation between the first and second load cam members 140, the ramp surfaces 142 of each will ride up or down one another to thereby cause axial translation of at least one of the load cam members 140 relative to the other. As previously described, the axial translation between the first and second clutch loading means will in turn cause axial translation of the pressure plate associated with the main clutch 82 for loading or unloading thereof. Also in the preferred embodiment, the means for locking one of the first or second clutch loading means comprises a locking spring 150 as shown in FIGS. 9 and 10. The locking spring 150 is generally annular in shape, and includes two outwardly extending tang portions 152 and 154.

Figure 11:
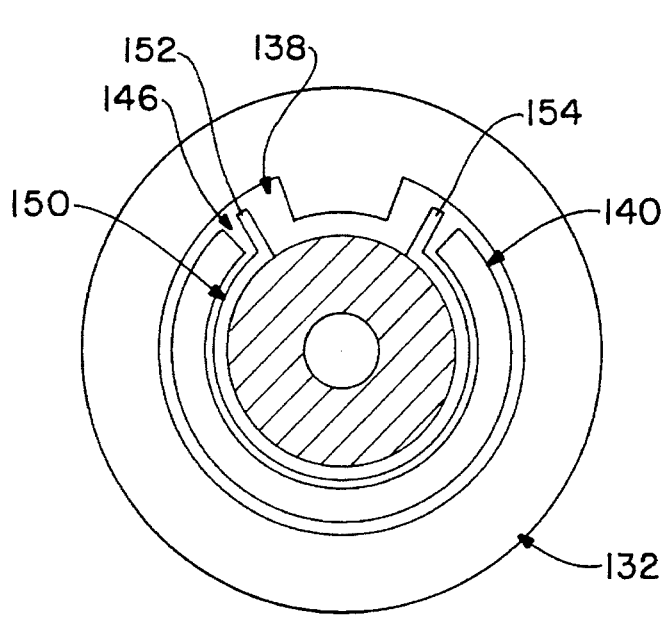
FIG. 11 is a cross-sectional view taken along line 1—1 of FIG. 4.

Turning back to FIG. 4, the preferred embodiment of the clutch actuating mechanism 44, the spline collars 132 are mounted annularly about the ramp portions 142 of load cam members 140 by slip-fit, to allow rotation between the load cam members 140 and spline collars 132 upon actuation of a pilot clutch 102 or 104. The load cam members 140 are in turn rotatably mounted on the rear output shaft 50 by slip-fit, to allow relative rotation with respect to shaft 50. Associated with each pair of spline collar 132 and load cam member 140, a locking spring 150 is positioned within a groove 160 formed in rear output shaft 50, and between the spline collar 132 and load cam member 140. The tangs 152 and 154 associated with the locking spring 150 extend into and cooperate with slots 138 in spline collar 132 and slot 146 formed in the load cam member 140. The locking spring 150 is provided to keep one of the load cam members 140 from turning relative to the shaft 50 on which they are rotatably mounted. Preventing rotation of one of the load cam members 150 relative to the other will cause differential rotation therebetween, which in turn will result in the cooperating ramp surfaces 142 engaging to cause axial translation of one of the load cam members 140 relative to the other. This function can be seen more distinctly with respect to FIG. 11. As seen in this figure, the spline collar 132 is positioned with respect to the load cam member 140 such that slots 138 of spline collar 132 cooperate with slot 146 of the load cam member 140 to allow tang portions 152 and 154 of the locking spring 150 to extend therebetween. In operation, the locking spring is selectively used to lock or unlock the load cam member 140 relative to shaft 50 as follows. As previously indicated, the load cam member 140 as well as spline collar 132 are rotatable relative to shaft 50 upon being differentially driven with respect thereto. Thus, the actuation of a pilot clutch 102 or 104 will selectively cause differential rotation between the spline collar 132 and load cam member 140 mounted with one another. The relative rotation between spline collar 132 and load cam member 140 in conjunction with a locking spring 150 will selectively lock or unlock spring 150 to the rear output shaft 50. To unlock the locking spring 150, relative clockwise rotation of the spline collar 132 will operate to apply force on the inside of tang 154 of locking spring 150. It should be recognized that upon application of force to the inside of either tang 152 or 154 will cause opening of spring 150 relative to shaft 50 to allow it to slip within the groove formed in shaft 50 and to allow load cam member 140 to rotate relative to shaft 50. Alternatively, upon relative rotation of the load cam member 140 to the spline collar 132 in a counter-clockwise direction, the load cam member 140 will apply force to the outside of tang member 154 which acts to tighten the locking spring 150 around rear output shaft 50. Tightening of the locking spring 150 on shaft 50 will prevent relative rotation therebetween, and will in turn prevent rotation of load cam member 140 relative to shaft 50. Thus, by selectively providing differential rotation between spline collar 132 and load cam member 140 by means of the pilot clutches 102 or 104, one of the first or second clutch loading means may be selectively locked to the rotating rear output shaft 50. Tightening of the locking spring 150 on shaft 50 results in the locking spring 150 functioning as a band clutch which grabs shaft 50 and prevents rotation with respect thereto. In the clutch actuating device 44, it is desirable to differentially rotate one of the load cam members 140 relative to the other and relative to the shaft to allow the ramp surfaces of the load cam members 140 to cause axial translation of one of the load cam members 140 relative to the other. Locking one of the load cam members 142 the shaft in association with the locking spring 150, while at the same time unlocking the other locking spring associated with the other load cam member facilitates differential rotation between the load cam members 140 so as to actuate or deactuate the main clutch 82 as previously described.

Figure 12:
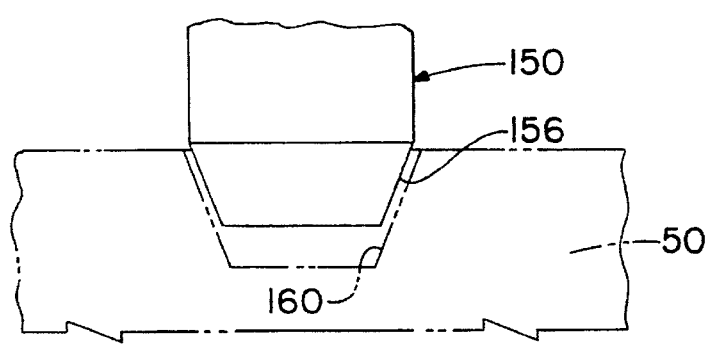
FIG. 12 shows an alternate embodiment of a locking spring for use in the clutch actuating device of the invention.

To further facilitate locking of one of the load cam members 140 relative to the rear output shaft 50 as described above, an alternate embodiment of the invention is shown in FIG. 12. In this embodiment, the locking spring 150 is formed with a tapered outer portion 156 which cooperates with a similarly tapered groove 160 formed in the rear output shaft as shown in FIG. 4. The tapered configuration of locking spring 150 in association with the V-shaped groove 160 formed in the drive shaft 50 facilitates locking of spring 150 with respect to shaft 50. The tapered surfaces 156 cooperate with the V-shaped groove 160 to form a cone-clutch type of an arrangement. The provision of locking spring 150 to facilitate differentially driving the load cam members 140 allows the pilot clutch torque to be reduced in a desired manner. To further enhance the action of the cone-clutch type arrangement shown in FIG. 12, suitable coatings may be applied to the tapered surfaces 156 of locking spring 150 and/or the surfaces of the groove 160 to increase friction between these surfaces. Additionally, although the locking spring 150 has been shown as a single member, a multi-wrap wire spring clip or other suitable means are contemplated herein.

Figure 13:
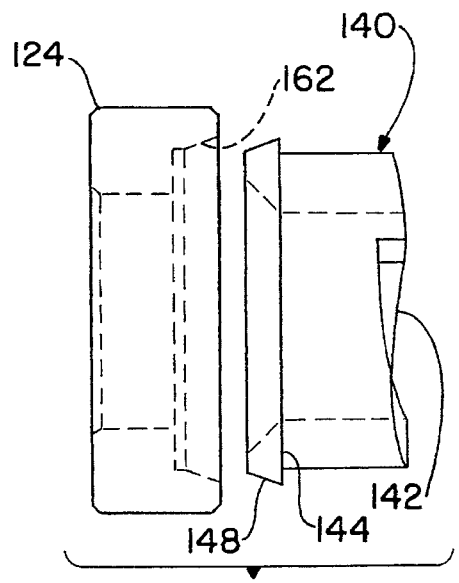
FIG. 13 shows an alternate embodiment of a load cam member and mating member for use in the clutch actuating device of the invention.

As an alternative to the use of a spring clip or in addition thereto, a cone type clutch may be formed between the load cam members 140 and the mate members 120 or 124 respectively. As seen in FIG. 13, the load cam member 140 may include tapered surfaces 148 on the flange portion 144 which cooperate with tapered surfaces 162 formed on mating member 124, for example. Again, these surfaces cooperate in a cone-clutch type of an arrangement to inhibit rotation of the load cam member 140 relative to shaft 50. In this manner, differential rotation between the load cam members 140 will cause axial translation to load or unload main clutch 82 as desired.

In operation, it should be recognized upon actuation of one of the pilot clutches 102 or 104, one of the first or second rotating members may be differentially driven to cause locking or unlocking of the first or second clutch loading means relative to the other. Differential rotation of one of the first or second clutch loading means relative to the shaft will cause direct actuation or deactuation of the main clutch 82, with power to actuate or deactuate the main clutch 82 supplied by a drive member of the vehicle drivetrain subassembly, being the rear output shaft 50 in the described embodiment.

While the foregoing description has set forth the preferred embodiment of the invention, it must be understood that numerous modifications, substitutions, and changes can be undertaken without departing from the true spirit and scope of the present invention as defined by the appended claims. For instance, while the clutch actuating device has been illustrated in an "on-demand" type torque transfer case, the clutch actuating device may be used in other types of transfer cases or in other vehicle drivetrain subassemblies, such as that associated with a primary vehicle clutch or a vehicle differential. The invention is therefore not limited to specific preferred embodiments as described, but is only limited by the following claims.

What is claimed is:

1. A clutch actuating device for use in a vehicle drivetrain subassembly having a clutch, comprising:

first and second rotating members rotatably mounted to a drive member of a vehicle drivetrain subassembly, said first and second rotating members being rotatable relative to said drive member and to each other;

first and second clutch loading means rotatably mounted to said drive member and being rotatable relative to one another, said first and second clutch loading means engaging one another to cause axial translation relative to one another upon relative rotation between said first and second clutch loading means;

first and second pilot clutches comprising at least one rotatable plate, said at least one plate of each pilot clutch being coupled to one of said first or second rotating members; and, means for selectively activating said first and second pilot clutches so as to selectively ground said first and second pilot clutches, wherein activating one of said first and second pilot clutches creates relative rotation between said first and second rotating members and correspondingly between said first and second clutch loading means to cause axial translation of said first clutch loading means relative to said second clutch loading means so as to engage the drivetrain subassembly clutch, and wherein activating the other of said first and second pilot clutches causes disengagement of the drivetrain subassembly clutch.

2. The clutch actuating device as recited in claim 1, wherein, said first and second rotating members comprise spline collars having a splined portion which is coupled to said at least one plate of a respective pilot clutch, wherein activation of said pilot clutch will selectively ground one of the first or second spline collars.

3. The clutch actuating device as recited in claim 2, wherein, each of said spline collars includes means for engaging locking means associated with said first or second clutch loading means for locking of said first or second clutch loading means relative to said drive member.

4. The clutch actuating device as recited in claim 3, wherein, said means for engaging said locking means comprise at least one slot formed in said first and second rotating members.

5. The clutch actuating device as recited in claim 1, wherein, said first and second clutch loading means comprise load cam members having first and second ramp surfaces respectively, which engage one another so as to cause axial translation of said load cam members relative to one another.

6. The clutch actuating device as recited in claim 5, wherein, said load cam members are annular members rotatably mounted on said drive member, and wherein said first and second rotating members are annular and rotatably mounted about said load cam members.

7. The clutch actuating device as recited in claim 5, wherein, said load cam members include means for engaging a locking means associated with each of said load cam members to selectively lock one of said load cam members to said drive member for rotation therewith.

8. The clutch actuating device as recited in claim 1, further comprising locking means associated with each of said first and second clutch loading means to selectively lock said clutch loading means relative to said drive member or to allow relative rotation therebetween.

9. The clutch actuating device as recited in claim 8, wherein, said locking means comprises a locking spring mounted around said drive member, wherein said locking spring is selectively tightened or loosened with respect to said drive member upon activation of said first or second pilot clutch and engages said clutch loading means with which it is associated to selectively lock said clutch loading means and cause relative rotation between said first and second clutch loading means.

10. The clutch actuating device as recited in claim 9, wherein, said locking spring includes first and second tang portions which extend into slots formed in said first and second rotating members and in said first and second clutch loading means, wherein, relative rotation between said rotating member and said clutch loading means will cause one of said rotating members or said clutch loading means to apply force to a tang of said locking spring to selectively tighten or loosen said locking spring around said drive member and whereby said tang portion of said locking spring will engage said clutch loading means to prevent relative rotation with respect to said drive member.

11. The clutch actuating device as recited in claim 8, wherein, said locking means includes an annular locking spring mounted around said drive member in a groove formed therein, said locking spring having a tapered outer portion which cooperates with a similarly tapered portion of said groove formed in said drive member to increase frictional engagement of said locking spring relative to said drive member upon tightening of said locking spring around said drive member within said groove.

12. The clutch actuating device as recited in claim 8, wherein, said locking means is a spring clip having a generally annular shape and being mounted around said drive member and functioning as a band clutch upon tightening thereof with respect to said drive member.

13. The clutch actuating device as recited in claim 8, wherein, said locking means comprises a cone clutch formed between said first and second clutch loading means and first and second mating members associated therewith, said first and second mating members being mounted on said drive member for rotation therewith, wherein said first and second mating members include first tapered surfaces which cooperate with second tapered surfaces formed on said first and second clutch loading means, such that upon frictional engagement between said first and second tapered surfaces, relative rotation between said clutch loading means and said drive member is inhibited.

* * * * *